United States Patent [19]
Urbach

[11] Patent Number: 5,568,930
[45] Date of Patent: Oct. 29, 1996

[54] JOINT ASSEMBLY

[75] Inventor: Brian A. Urbach, Rochester Hills, Mich.

[73] Assignee: TRW Inc., Lyndhurst, Ohio

[21] Appl. No.: 519,245

[22] Filed: Aug. 25, 1995

[51] Int. Cl.$^6$ .................... F16J 9/00; F16D 1/12
[52] U.S. Cl. ............. 277/29; 277/212 FB; 403/134
[58] Field of Search ................ 277/29, 212 FB, 277/212 R, 212 C, 212 F, 101; 403/134, 288

[56] References Cited

U.S. PATENT DOCUMENTS

| | | | |
|---|---|---|---|
| 3,187,590 | 6/1965 | Duggan | 277/29 |
| 3,208,290 | 9/1965 | Mathues et al. . | |
| 3,248,955 | 5/1966 | Templeton . | |
| 3,262,706 | 7/1966 | Hassan . | |
| 3,322,445 | 5/1967 | Hassan . | |
| 3,403,932 | 10/1968 | Kutcher | 277/212 FB |
| 3,441,298 | 4/1969 | Herbenar et al. . | |
| 3,476,417 | 11/1969 | Born et al. . | |
| 4,003,667 | 1/1977 | Gaines et al. | 277/212 FB |
| 4,154,546 | 5/1979 | Merrick et al. . | |
| 5,066,160 | 11/1991 | Wood . | |
| 5,199,718 | 4/1993 | Niemiel | 277/29 |
| 5,380,114 | 1/1995 | Urbach . | |

*Primary Examiner*—Daniel G. DePumpo
*Attorney, Agent, or Firm*—Tarolli, Sundheim, Covell, Tummino & Szabo

[57] ABSTRACT

A ball joint assembly (10) includes a housing (12) having a socket chamber (14) in which a ball end portion (18) of a movable stud member (16) is disposed. A shank portion (22) of the movable stud member (16) extends from the housing (12). An improved boot seal assembly (40) includes a flexible seal wall (48) having an inner end portion (50) which engages the housing (12) and an outer end portion (54) which engages the shank portion (22) of the stud member (16). The seal wall (48) cooperates with the housing (12) and the stud member (16) to form a chamber (42) in which lubricant (44) is disposed. A vent opening (70) is provided in the outer end portion (54) of the seal wall (48). A retainer ring (62) blocks the vent opening (70) in the outer end portion (54) of the seal wall (48) when the lubricant pressure in the chamber (42) is less than a predetermined pressure. When the lubricant pressure in the chamber (42) exceeds the predetermined pressure, the retainer ring (62) and the outer end portion (54) of the seal wall (48) move relative to each other under the influence of the lubricant pressure to vent pressure from the chamber (42) through the vent opening (70).

5 Claims, 2 Drawing Sheets

JOINT ASSEMBLY

BACKGROUND OF THE INVENTION

The present invention relates generally to a joint assembly and more specifically to a joint assembly having a boot seal which at least partially defines a chamber containing lubricant. Ball joint assemblies commonly include a housing having a socket chamber in which a ball end portion of a stud member is disposed. A shank portion of the stud member extends axially out of the housing. A boot seal engages the housing and the shank portion of the stud member to prevent external environmental contamination from entering the housing. The boot seal cooperates with the housing and the stud member to form a chamber which holds lubricant, such as a suitable grease. In order to vent excessive lubricant pressure from the chamber, a slit has been provided in the boot seal to enable lubricant to be flow from the chamber. Unfortunately, external contaminants can enter the lubricant chamber through the slit in the side wall of the boot seal. In addition, the forming of the slit in the boot seal has required a separate operation and has added to the cost of the ball joint assembly. One known ball joint assembly having this construction is disclosed in U.S. Pat. No. 3,208,290 issued Sep. 28, 1965 and entitled "Ball Joint Purgeable Seal Means".

SUMMARY OF THE INVENTION

The present invention provides a new and improved joint assembly having a member which extends from a housing and is movable relative to the housing. A flexible seal wall is connected with the housing and the movable member which extends from the housing. The seal wall at least partially defines a chamber which contains lubricant under pressure. A vent opening is formed in the seal wall.

In accordance with one of the features of the present invention, a retainer presses against the seal wall and blocks the vent opening when the lubricant pressure in the chamber is less than a predetermined pressure. When the lubricant pressure in the chamber exceeds the predetermined pressure, the retainer and seal wall move relative to each other under the influence of the lubricant pressure. The relative movement between the retainer and seal wall enables lubricant to be vented from the chamber. When the lubricant pressure in the chamber is equal to or less than the predetermined pressure, the retainer blocks the opening in the seal wall to prevent contaminants from entering the chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
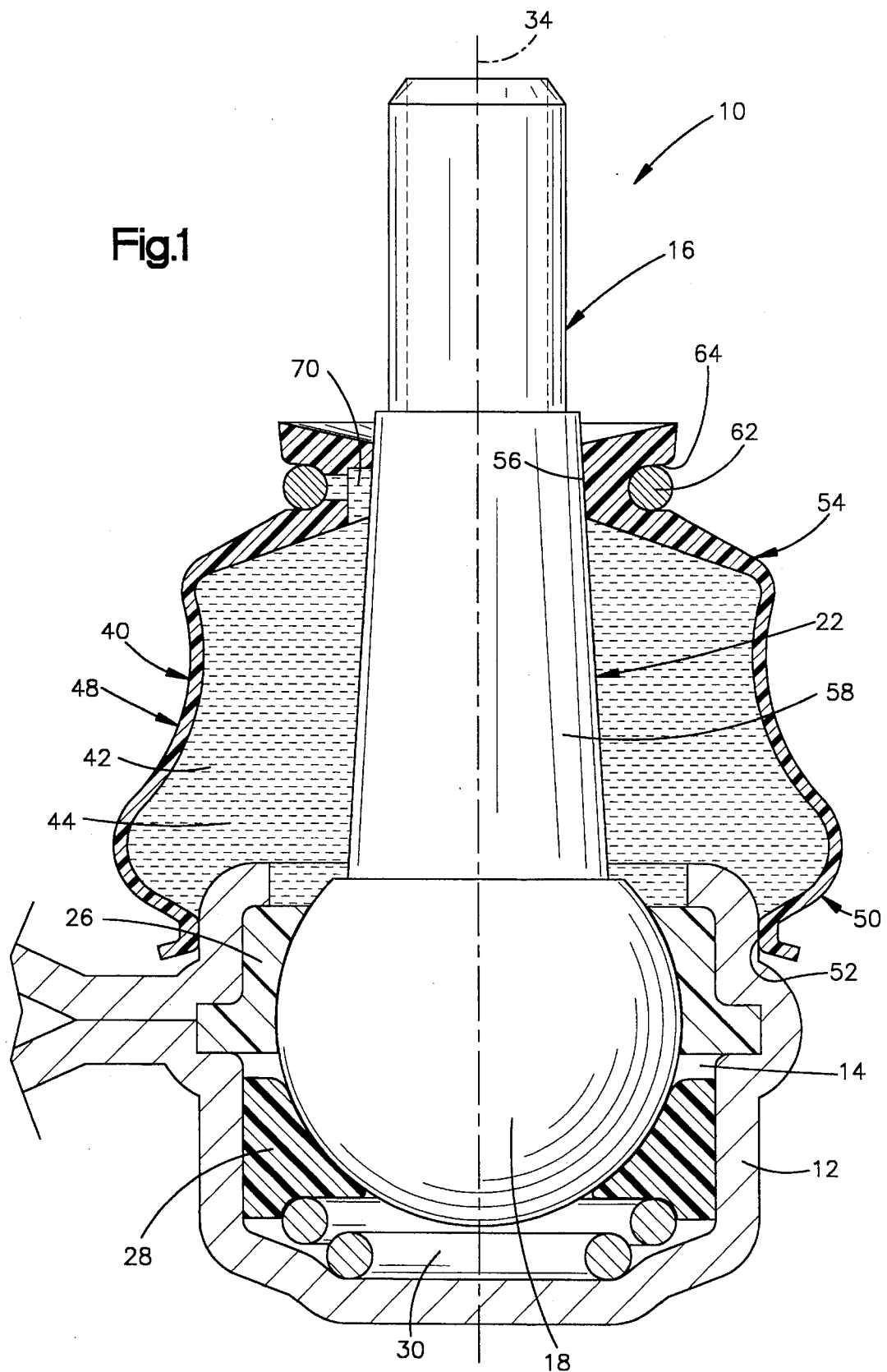
FIG. 1 is a fragmentary sectional view of a ball joint assembly constructed in accordance with the present invention.

A ball joint assembly 10 constructed in accordance with the present invention is illustrated in FIG. 1. The ball joint assembly 10 includes a housing 12. In the illustrated embodiment of the invention, the housing 12 is stamped from a sheet metal blank. However, it is contemplated that the housing 12 could be formed in other ways if desired. For example, the housing 12 could be a metal casting.

The housing 12 defines a socket chamber 14 having a generally cylindrical configuration. A movable stud member 16 has a ball end portion 18 which is disposed in the socket chamber 14. The ball end portion 18 of the stud member 16 is formed as a portion of a sphere.

A generally cylindrical shank portion 22 of the stud member 16 extends axially outward from the ball end portion 18. In the illustrated embodiment of the invention, the shank portion 22 and ball end portion 18 of the stud member 16 are forged as one-piece of metal. However, the ball end portion 18 of the stud member 16 could have any one of many different known constructions and configurations if desired.

An annular outer bearing seat 26 is disposed in the socket chamber 14. An annular inner bearing seat 28 is disposed in the socket chamber 14 in a coaxial relationship with the outer bearing seat 26. The annular outer and inner bearing seats 26 and 28 are formed of a suitable polymeric material. A metal coil spring 30 presses the inner bearing seat 28 against the ball end portion 18 of the stud member 16 and presses the ball end portion of the stud member against the outer bearing seat 26. The outer and inner bearing seats 26 and 28 cooperate to support the stud member 16 for universal sidewise tilting movement from the illustrated upright or initial position shown in FIG. 1. In addition, the bearing seats 26 and 28 support the stud member 16 for rotational movement about a longitudinal central axis 34 of the stud member.

The general construction of the housing 12, stud member 16 and outer and inner bearing seats 26 and 28 is the same as is disclosed in U.S. Pat. No. 5,066,160 issued Nov. 19, 1991 and entitled "Ball Joint". However, it is contemplated that the ball joint assembly 10 could have a different construction if desired. In fact, the ball joint assembly 10 could be a joint assembly having a construction other than a ball and socket construction.

An improved boot seal 40 (FIG. 1) seals against the housing 12 and stud member 16 to block entrance of contaminants from the environment around the ball joint assembly 10 into the socket chamber 14. In addition, the boot seal 40 cooperates with the housing 12 and stud member 16 to form a chamber 42 in which a body of lubricant 44 is disposed. The lubricant 44 is effective to lubricate the ball end portion 18 of the stud member 16 and the bearing seats 26 and 28 to enhance the operating life of the ball joint assembly 10.

The boot seal 40 has a flexible seal wall 48 which is formed of a suitable polymeric material. For example, the seal wall 48 could be formed of Compound #1806-85A urethane available from Trostel. The lubricant 44 may be any suitable grease or lubricating material.

The seal wall 48 has an inner end portion 50 with a cylindrical inner side surface 52 which is disposed in sealing engagement with the housing 12. In addition, the seal wall 48 has an outer end portion 54 with a cylindrical inner side surface 56 which is disposed in sealing engagement with a generally cylindrical outer side surface 58 of the shank portion 22.

A toroidal retainer ring 62 (FIG. 2) is disposed in an annular groove 64 in the outer end portion 54 of the boot seal 40. The retainer ring 62 presses the cylindrical inner side surface 56 on the outer end portion 54 of the boot seal wall 48 into tight sealing engagement with the outer side surface 58 on the stud member 16. If desired, the inner end portion 50 (FIG. 1) of the boot seal 40 could be pressed against the housing 12 by a retainer ring similar to the retainer ring 62.

In accordance with one of the features of the present invention, a vent opening 70 (FIG. 2) is formed in the boot seal wall 48 to vent excessive lubricant pressure from the chamber 42. The retainer ring 62 blocks the vent opening 70, in the manner shown in FIG. 2, when the lubricant pressure in the chamber 42 is less than a predetermined pressure. When the lubricant pressure in the chamber 42 becomes excessive, the retainer ring 62 and boot seal wall 48 move relative to each other (FIG. 3) under the influence of the fluid pressure applied against the retainer ring and seal wall by the lubricant 44.

Figure 2:
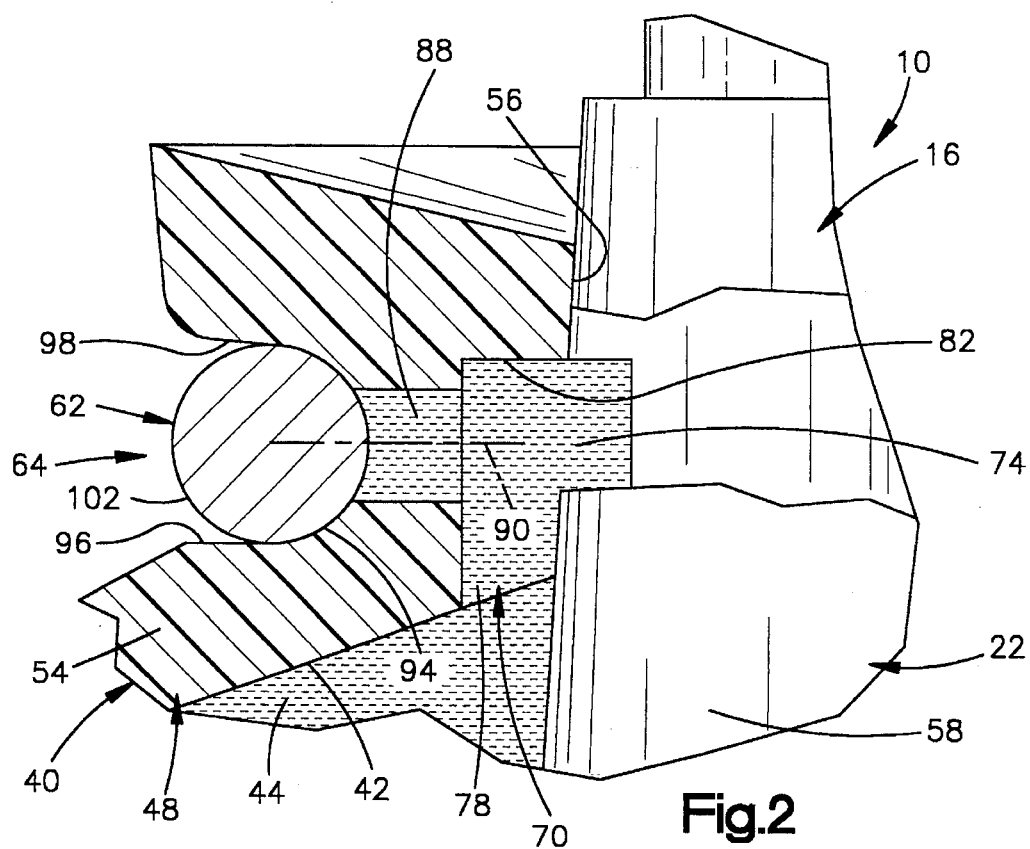
FIG. 2 is an enlarged fragmentary view of a portion of the ball joint assembly of FIG. 1 and illustrating the manner in which a retainer ring blocks a vent opening in a boot seal.
Figure 3:
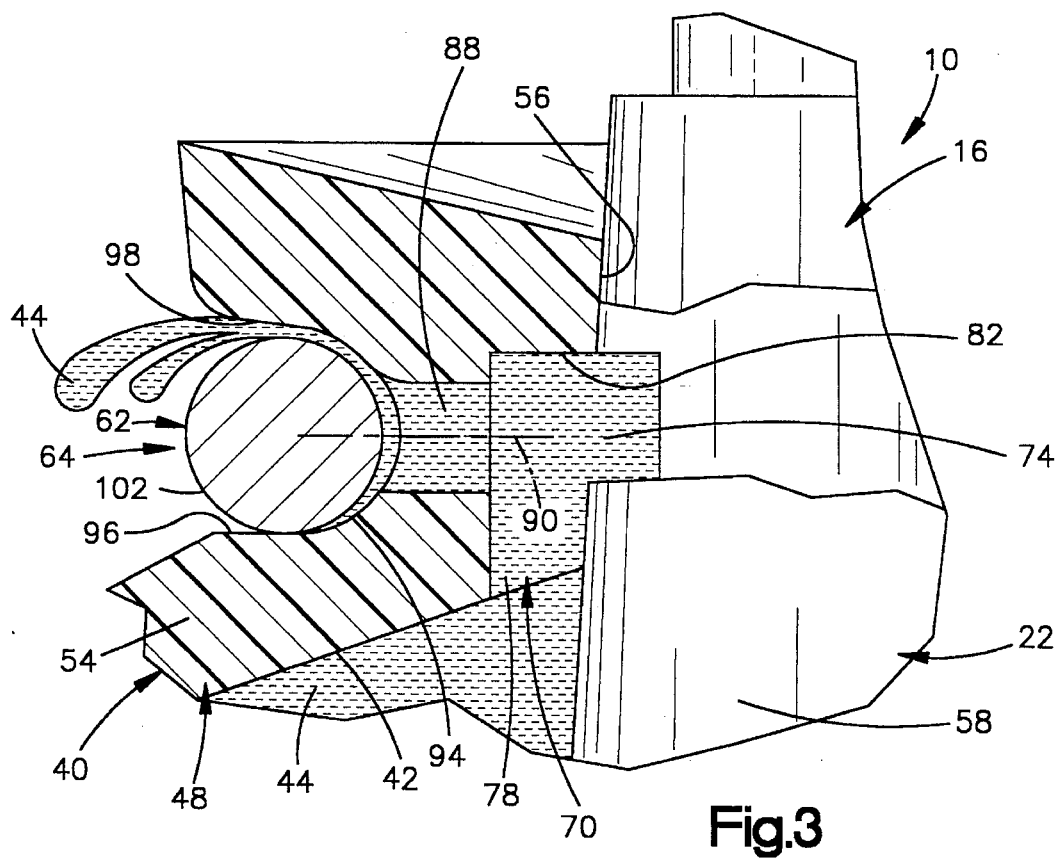
FIG. 3 is an enlarged fragmentary view, generally similar to FIG. 2, illustrating the manner in which excessive lubricant pressure is vented from a chamber in the boot seal.

Relative movement between the vent ring 62 and boot seal wall 48 under the influence of excessive lubricant pressure, enables lubricant to flow out of the chamber 42 in the manner illustrated schematically in FIG. 3. When the lubricant pressure in the chamber 42 becomes equal to or less than a predetermined pressure, the retainer ring 62 is again effective to block the vent opening in the manner illustrated in FIG. 2. This enables the retainer ring 62 to retain the lubricant 44 in the chamber 42 and to prevent contaminants from entering the chamber 42 through the vent opening 70.

The vent opening 70 includes a relatively large main section 74 (FIG. 2) which extends axially along the shank portion 22 of the stud member 16. The main section 74 of the vent opening 70 is formed as a portion of a cylinder. Thus, the main section 74 of the vent opening 70 has a side wall 78 which is formed as a portion of a cylinder. The side wall 78 has a longitudinal central axis which extends parallel to the coincident longitudinal central axes 34 (FIG. 1) of the stud member 16 and the cylindrical inner side surface 56 on the outer end portion 54 of the boot seal wall 48. However, the central axis of the side wall 78 (FIG. 2) of the vent opening 70 is offset to one side, that is toward the left as viewed in FIG. 2, of the coincident central axes 34 of the shank portion 22 of the stud member 16 and the cylindrical inner side surface 56 on the outer end portion 54 of the boot seal wall 48.

The main section 74 of the vent opening 70 also has an end wall 82 (FIG. 2). The end wall 82 extends perpendicular to the side wall 78 of the main section 74 of the vent opening 70 and to the cylindrical inner side surface 56 on the outer end portion 54 of the boot seal wall 48. Although one specific configuration for the main section 74 of the vent opening 70 has been described herein, it should be understood that the main section 74 of the vent opening 70 could have a different configuration if desired. For example, the main section 74 of the vent opening 70 could have a polygonal configuration if desired.

In addition to the main section 74, the vent opening 70 also includes a vent passage 88 (FIG. 2) which extends between the main section 74 of the vent opening 70 and the annular groove 64 in the outside of the outer end portion 54 of the boot seal wall 48. The vent passage 88 has a cylindrical configuration with a central axis 90 which extends perpendicular to the coincident central axes 34 of the shank portion 22 of the stud member 16 and the cylindrical inner side surface 56 on the outer end portion 54 of the boot seal wall 48. The central axis 90 of the vent passage 88 extends in a radial direction relative to the coincident circular axes of the retainer ring 62 and groove 64.

The groove 64 has an annular bottom portion 94 (FIG. 2). The annular bottom portion 94 of the groove 64 has a central axis which is coincident with the central axes 34 of the shank portion 22 of the stud member 16 and the inner side surface 56 on the outer end portion 54 of the boot seal wall 48. The vent passage 88 intersects the bottom portion 94 of the groove 64. The groove 64 also has a pair of generally parallel annular side surfaces 96 and 98 which extend radially outward from the bottom portion 94 of the annular groove 64.

The annular retainer ring 62 has a circular cross sectional configuration (FIG. 2). The retainer ring 62 has an annular outer side surface 102 which presses against the bottom portion 94 of the annular groove 64. The annular retainer ring 62 is sized so that the retainer ring applies a radially inward directed force against the bottom portion 94 of the annular groove 64. The radially inward directed force applied against the bottom portion 94 of the annular groove 64 by the outer side surface 102 of the retainer ring 62 presses the cylindrical inner side surface 56 on the outer end portion 54 of the boot seal wall 48 firmly against the outer side surface 58 of the shank portion 22. This prevents leakage of lubricant at the joint formed between the outer end portion of the boot seal and the stud member 16.

Although the retainer ring 62 has a circular cross sectional configuration in a radial plane, the retainer ring could have a different configuration if desired. For example, the retainer ring could be a strap having a rectangular configuration in a radial plane.

The outer side surface 102 on the retainer ring 62 has a cross sectional diameter which is greater than the diameter of the cylindrical vent passage 88. Therefore, the outer side surface 102 on the retainer ring 62 extends completely across the axially outer end of the vent passage 88. This enables the retainer ring 62 to block a flow of lubricant and/or contaminants through the vent opening 70 when the lubricant pressure in the chamber 42 is less than a predetermined pressure (FIG. 2).

When the pressure of the lubricant 44 in the chamber 42 exceeds the predetermined pressure, the pressure applied against the retainer ring 62 by the lubricant 44 compresses the portion of the boot seal wall 48 disposed on a side of the stud member opposite from the vent opening 70 against the outer side surface 58 of the shank portion 22. This enables the retainer ring 62 to be moved through a small distance toward the left from the closed position shown in FIG. 2 to the open position shown in FIG. 3. As this occurs, the resilient material of the boot seal wall 58 is deflected slightly upward from the position shown in FIG. 2 to the position shown in FIG. 3 by the fluid pressure of the lubricant in the vent opening 70. This results in the vent passage 88 and retainer ring 62 moving relative to each other, under the influence of the lubricant pressure, to form an opening between the retainer ring 62 and the outer end portion 54 of the boot seal wall 48 in the manner illustrated schematically in FIG. 3.

Lubricant 44 is purged from the chamber 42 through the vent passage 88 until the fluid pressure in the lubricant is reduced to the predetermined pressure. As this occurs, the force applied against the retainer ring 62 and the outer end portion 54 of the boot seal wall 48 is reduced. This enables the retainer ring 62 and outer end portion 54 of the boot seal wall 48 to move back to the closed condition illustrated in FIG. 2. When the retainer ring 62 and outer end portion 54 of the boot seal wall 48 are in the closed condition illustrated in FIG. 2, the retainer ring 62 blocks the flow of lubricant through the vent passage 88. In addition, the retainer ring 62 blocks the flow of contaminants into the chamber 42 through the vent passage.

Although only the retainer ring 62 is provided around the outer portion 54 of the boot seal 40, it is contemplated that a similar retainer ring could be provided around the inner portion 50 of the boot seal. If a retainer ring is provided around the inner portion 50 of the boot seal 40, the retainer ring would press the inner side surface 52 on the lower portion 50 of the boot seal against the housing 12. A vent passage, corresponding to the vent passage 70, could be provided in the inner portion 50 of the boot seal 40 in association with a retainer ring.

From the above description of the invention, those skilled in the art will perceive improvements, changes and modifications. Such improvements, changes and modifications within the skill of the art are intended to be covered by the appended claims.

Having described the invention, the following is claimed:

1. A joint assembly comprising:

a housing member;

a movable member extending from said housing member and movable relative to said housing member;

a flexible seal wall having a first end portion connected with said housing member and a second end portion connected with said movable member, said flexible seal wall cooperating with said housing member and said movable member to at least partially define a chamber containing lubricant, said flexible seal wall including surface means which defines a vent opening extending through one of said end portions of said flexible seal wall; and retainer means for pressing said one end portion of said flexible seal wall against one of said members and for blocking said vent opening in said one end portion of said flexible seal wall when lubricant pressure in the chamber is less than a predetermined pressure, said retainer means and said one end portion of said flexible seal wall being movable relative to each other under the influence of lubricant pressure to vent lubricant pressure through said vent opening in said one end portion of said flexible seal wall when the lubricant pressure exceeds the predetermined pressure.

2. A joint assembly as set forth in claim 1 wherein said retainer means includes an annular member having a circular cross sectional configuration in a radial plane.

3. A joint assembly as set forth in claim 1 wherein said one end portion of said flexible seal wall is said second end portion, said second end portion of said flexible seal wall extends around a portion of said movable member and is pressed against said portion of said movable member by said retainer means.

4. An assembly as set forth in claim 1 wherein said housing at least partially defining a socket chamber, said movable member having ball end portion which is disposed in said socket chamber and a shank portion which extends outward from said ball end portion, said one end portion of said flexible seal wall being said second end portion of said flexible seal wall, said second end portion of said flexible seal wall extends around said shank portion of said movable member and is pressed against said shank portion of said movable member by said retainer means.

5. A joint assembly as set forth in claim 1 wherein said surface means which defines said vent opening extending through one of said end portions of said flexible seal wall includes first surface means for defining a relatively large recess which extends from the chamber containing lubricant under pressure and second surface means for defining a relatively small passage which extends from said relatively large recess to an outer side of said flexible seal wall, said retainer means extends across an outer end of said relatively small passage to block lubricant flow.

* * * * *